United States Patent
Puente et al.

(10) Patent No.: US 9,482,400 B2
(45) Date of Patent: Nov. 1, 2016

(54) LIGHT-EMITTING DEVICE FOR A MOTOR VEHICLE HEADLAMP AND HEADLAMP EQUIPPED WITH SAID DEVICE

(71) Applicant: Valeo Iluminacion Sociedad Anonima, Martos (ES)

(72) Inventors: Jean-Claude Puente, Livry Gargan (FR); Carlos Gomez, Martos (ES); Jose-Manuel Herrera, Martos (ES); Eric Moisy, Jaean (FR)

(73) Assignee: Valeo Illuminacion Sociedad Anonima, Martos (ES)

( * ) Notice: Subject to any disclaimer, the term of this patent is extended or adjusted under 35 U.S.C. 154(b) by 95 days.

(21) Appl. No.: 14/098,946

(22) Filed: Dec. 6, 2013

(65) Prior Publication Data

US 2014/0160780 A1 Jun. 12, 2014

(30) Foreign Application Priority Data

Dec. 7, 2012 (FR) ...................................... 12 61779

(51) Int. Cl.
*F21S 8/10* (2006.01)
*B60Q 1/20* (2006.01)
*F21V 17/06* (2006.01)

(52) U.S. Cl.
CPC .............. *F21S 48/1104* (2013.01); *B60Q 1/20* (2013.01); *F21S 48/1159* (2013.01); *F21S 48/1208* (2013.01); *F21S 48/1233* (2013.01); *F21S 48/13* (2013.01); *F21S 48/1305* (2013.01); *F21S 48/1352* (2013.01); *F21S 48/142* (2013.01); *F21S 48/328* (2013.01); *F21S 48/115* (2013.01);

(Continued)

(58) Field of Classification Search
CPC ... B60Q 1/20; F21S 48/1104; F21S 48/1159; F21S 48/1208; F21S 48/1233; F21S 48/13; F21S 48/1305; F21S 48/1352; F21S 48/142; F21S 48/115; F21S 48/1317; F21S 48/1388
USPC ................................. 362/516, 517, 519, 545
See application file for complete search history.

(56) References Cited

U.S. PATENT DOCUMENTS

2004/0223338 A1* 11/2004 Koike ....................... F21K 9/00
362/545
2008/0225542 A1* 9/2008 Mertens ............... B60Q 1/0058
362/517

(Continued)

FOREIGN PATENT DOCUMENTS

CN 201386966 1/2010
DE 102006046167 4/2008

(Continued)

*Primary Examiner* — Peggy Neils
*Assistant Examiner* — Zheng Song
(74) *Attorney, Agent, or Firm* — Jacox, Mechstroth & Jenkins

(57) ABSTRACT

A light-emitting device for a motor vehicle headlamp, said device comprising a housing, a light source disposed on said housing and an optical device directing one or more light beams emitted by said source, said housing comprising a projecting element for allowing a fixed position of said optical element with respect to said housing. This device is noteworthy in that said projecting element comprises at least one hollow rib formed inside an enclosure defined by said housing and said optical device comprises, opposite the housing, a slot that nests at least partially with said hollow rib of said housing.
The invention also relates to a headlamp, in particular for a motor vehicle, comprising said emitting device.

31 Claims, 3 Drawing Sheets

(52) U.S. Cl.
CPC ......... *F21S 48/1317* (2013.01); *F21S 48/1388* (2013.01); *F21V 17/06* (2013.01)

(56) References Cited

U.S. PATENT DOCUMENTS

| | | | | |
|---|---|---|---|---|
| 2008/0225544 A1* | 9/2008 | Fujiwara | ............... | B60Q 1/0041 362/538 |
| 2009/0097247 A1* | 4/2009 | Tseng | ............... | F21K 9/00 362/241 |
| 2012/0201043 A1* | 8/2012 | DiPenti | ............... | F21S 48/1104 362/545 |
| 2012/0281424 A1* | 11/2012 | Hansen | ............... | B60Q 1/16 362/517 |
| 2013/0077335 A1* | 3/2013 | Murley | ............... | F21S 48/1104 362/517 |
| 2013/0215632 A1* | 8/2013 | Jackl | ............... | F21S 48/1109 362/514 |

FOREIGN PATENT DOCUMENTS

| | | |
|---|---|---|
| DE | 102012207460 | 11/2012 |
| SG | 172770 | 8/2011 |
| WO | 2010069159 | 6/2010 |

* cited by examiner

LIGHT-EMITTING DEVICE FOR A MOTOR VEHICLE HEADLAMP AND HEADLAMP EQUIPPED WITH SAID DEVICE

CROSS-REFERENCE TO RELATED APPLICATIONS

This application claims priority to French Application No. 1261779 filed Dec. 7, 2012.

BACKGROUND OF THE INVENTION

1. Field of the Invention

The present invention relates to a light-emitting device for a motor vehicle headlamp and also to a headlamp equipped with the device. Although provided more particularly for use in additional headlamps such as foglamps, the invention may also be used in high-beam lamps, low-beam lamps or any other type of vehicle headlamp that is used to light the roadway.

Additional headlamps are understood to be headlamps intended to be added to a vehicle after it has been manufactured, in order to personalize it, in contrast to what are known as built-in headlamps that are present on the vehicle when it leaves the production line. The former are very often optional whereas the second are very often mandatory on account of the regulations in force.

2. Description of the Related Art

In this field, emitting devices that comprise a housing accommodating a light source and an optical device directing a light beam emitted by the source are known.

Good positioning of the source with respect to the optical device is necessary in order that the beam emitted by the optical device is guided correctly, in particular when the source comprises light-emitting diodes.

Various positioning solutions have already been proposed.

In the case of the additional headlamps, it is known in particular to position the headlamp with respect to its surroundings while it is being fixed to the vehicle. However, this solution does not always allow satisfactory positioning precision.

In the case of the built-in headlamps, it is known to position the optical device while giving it one or more degrees of freedom, allowing the height of the beam emitted to be adjusted. However, such solutions are relatively complex.

SUMMARY OF THE INVENTION

The invention has the aim of remedying the abovementioned drawbacks and to this end proposes a light-emitting device for a motor vehicle headlamp, the light-emitting device comprising a housing, a light source disposed on the housing and an optical device directing one or more light beams emitted by the light source.

According to the invention, the housing comprises a projecting element for allowing a fixed position of said optical device with respect to the housing. A "fixed" position is understood to mean a position in which the optical device is immobilized in all spatial directions.

By having the light source supported by the housing and by positioning the optical device with respect to the housing, better indexing of the optical device with respect to the light source is obtained without the use of additional components. Definitive fixing of the optical device to the housing may be obtained by any suitable, possibly complementary, means.

According to various features of the invention which may be taken together or separately:
- the projecting element comprises at least one hollow rib formed inside an enclosure defined by the housing,
- the hollow rib of the housing is rectilinear and/or comprises a number of arms,
- the optical device comprises, opposite the housing, a slot that nests at least partially with the hollow rib of the housing,
- the slot forms a hollow rib on an opposite face of the optical device from the housing,
- the light source emits one or more light beams centered on an axis which is transverse to an optical axis of the light-emitting device,
- the light source comprises one or more light-emitting diodes,
- the light-emitting diode or diodes are fixed to a printed circuit board,
- the diode or diodes are disposed in the region of the hollow rib of the housing, notably in the region of side walls of the hollow rib of the housing,
- the hollow rib of the housing supports the LEDs, in particular via the printed circuit board,
- the hollow rib of the optical device comprises one or more openings for allowing the light emitted by the diode or diodes to pass through,
- the optical device is a reflector,
- the reflector reflects all or part of the beam emitted by said light source so as to shape the beam emitted by the light-emitting device,
- the reflector is positioned on the hollow rib of the housing such that the diode or diodes is/are located at one or more foci of the reflector,
- the reflector comprises a number of reflection cavities, in particular each cavity cooperating with a separate light source; according to an optional embodiment, the hollow rib of the reflector separates these various cavities,
- in a preferable, but nonlimiting manner, the hollow rib of the reflector, the cavities and the light sources are arranged such that the light rays emitted by a given one of the light sources only reaches the reflector cavity that is associated therewith,
- the reflector and the hollow rib or ribs of the reflector separating these cavities are made in one piece from the same material,
- the housing defines an enclosure for the light source,
- the light source is in thermal contact with the housing and said housing is designed to allow thermal dissipation of the heat released by the light source,
- the hollow rib of the housing is designed to increase the heat exchange surface area,
- the hollow rib of the housing is oriented toward the inside and/or the outside of the housing,
- the hollow rib of the housing comprises two flanks connected by a bottom,
- the hollow rib of the housing, as seen from outside the housing, forms a groove,
- the hollow rib of the housing is made from the same material as the housing,
- the hollow rib of the housing is furnished with heat dissipation fins,
- the fins are located in said groove,
- the fins are located outside the enclosure defined by the housing,
- the fins are located within the volume of the housing, that is to say that they do not protrude beyond the outer surface of the housing, the hollow rib or ribs has/have a longitudinal axis of extension, the fins are transverse to said direction of extension of the hollow rib of the housing, the fins extend from the bottom of the hollow rib of the housing to edges of the flanks thereof, opposite the bottom, and/or from one of the flanks to the other, the fins are at least provided in the vicinity of a part of the hollow rib of the housing carrying the light source, the fins are distributed regularly along the hollow rib of the housing, the housing comprises flanges for fixing to a support, the flanges are located on either side of the hollow rib of the housing, at one of the ends thereof.

According to this last feature, it is possible to adjust the height of the beam emitted without, however, making use of adjusting mechanisms that modify the orientation of the optical device with respect to the housing.

The invention also relates to a motor vehicle headlamp comprising the emitting device as described above.

These and other objects and advantages of the invention will be apparent from the following description, the accompanying drawings and the appended claims.

BRIEF DESCRIPTION OF THE ACCOMPANYING DRAWINGS

Further features and advantages of the invention will become apparent from reading the following detailed description, in order to understand which reference is made to the appended drawings, in which:

FIG. 1 is an exploded perspective view of one exemplary embodiment of the emitting device and of the headlamp according to the invention;

FIG. 2 schematically illustrates, in a radial section plane, the emitting device and the headlamp from FIG. 1;

DETAILED DESCRIPTION OF THE PREFERRED EMBODIMENTS

Figure 1:
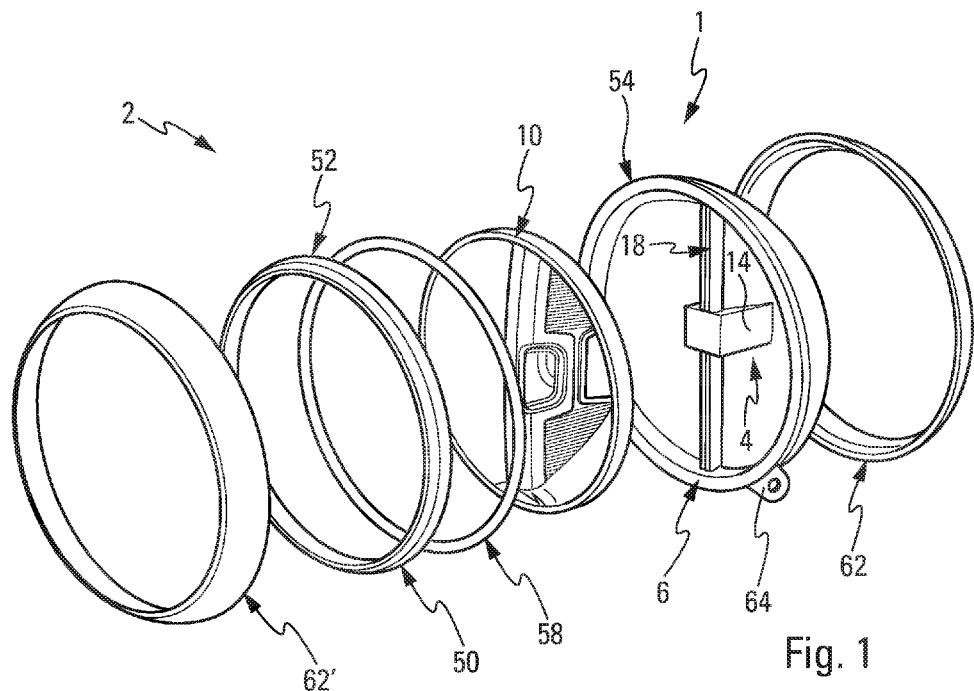
Figure 2:
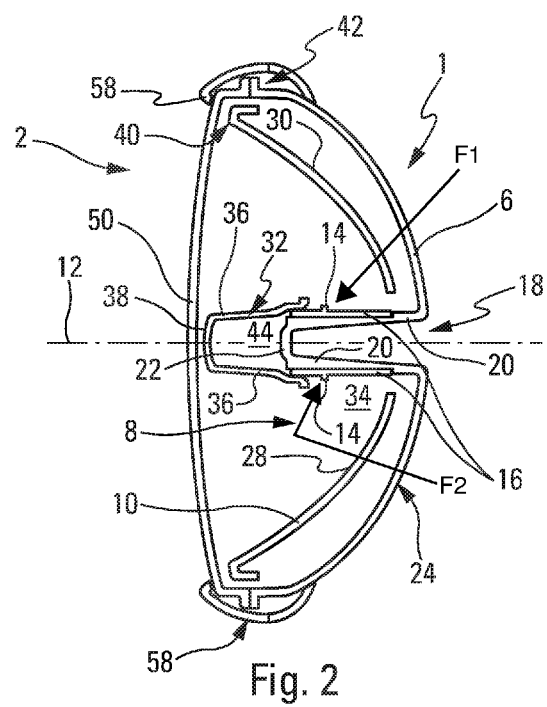
Figure 3:
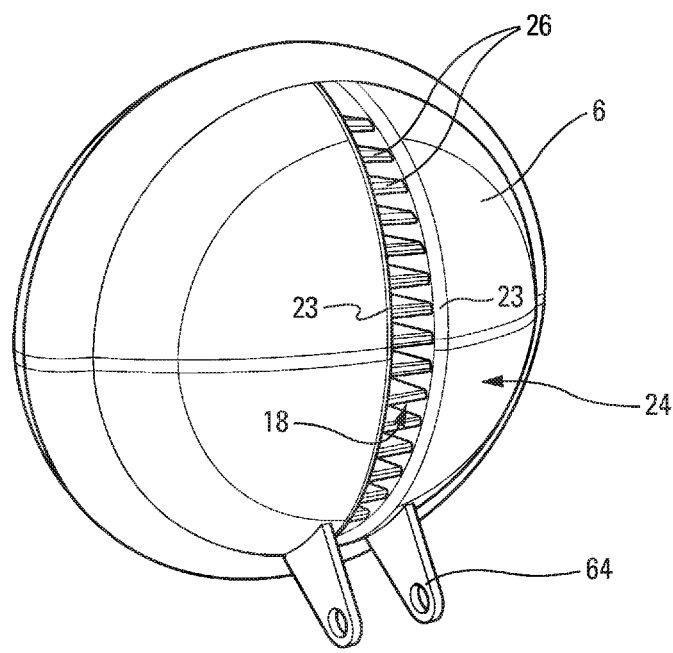
FIG. 3 is a perspective rear view of the emitting device and of the headlamp from FIG. 1.

As illustrated in FIGS. 1 to 3, the invention firstly relates to a light-emitting device 1 for a motor vehicle headlamp 2.

The light-emitting device 1 comprises a housing 6 and a light source 4 disposed on the housing 6 which defines in this case an enclosure 8 for the light source 4.

The device 1 also comprises an optical device directing one or more light beams emitted by the light source 4. the optical device is designed in particular to concentrate the light beam or beams emitted by the light source 4. In this way, the beam emitted by the light-emitting device 1, which could in particular be located inside an emission cone centered on an optical axis 12 of the light-emitting device 1, is shaped.

The optical device is, for example, a reflector 10 for reflecting the beam or beams emitted by the light source 4. In an alternative or combined manner, it may of course comprise any other optical element, such as lenses, for directing while intensifying the beam or beams emitted by the light source 4.

The light source 4 comprises at least one light-emitting diode 14. The diode or diodes 14 is/are placed, for example, on a support 16 such as, in particular, an insulated metal substrate, for supplying the diodes 14 with electricity. The supports 15 may also incorporate electronic components (not shown) which are involved in the control of the diodes 14.

According to the invention, the housing 6 comprises a projecting element for allowing a fixed position of the optical element with respect to the housing 6. This provides a particularly simple solution that encourages correct placement of the optical device with respect to the light source 4.

The projecting element comprises at least one hollow rib 18 formed inside the enclosure 8 defined by the housing 6. The hollow rib 18 of the housing 6 is advantageously designed to immobilize the optical reflector in all spatial directions.

According to a preferred embodiment, the diode or diodes 14 is/are disposed, in particular fixed, in the region of the hollow rib 18 of the housing 6, notably in the region of flanks 20 of the hollow rib 18, in particular on either side of the hollow rib 18.

The source 4 in this case emits one or more light beams centered on an axis which is transverse, in particular orthogonal, to the optical axis 12 of the light-emitting device 1 according to the invention and the optical device rectifies the beam or beams emitted in order to direct them along the optical axis 12.

The flanks 20 of the hollow rib 18 of the housing 6 are connected in this case by a bottom 22. The hollow rib 18 of the housing 6 has a U-shaped section, the flanks 20 being approximately parallel.

The hollow rib 18 of the housing 6 is advantageously made from the same material as the housing 6. In other words, the housing 6 and the hollow rib 18 of the housing 6 form one and the same single component.

The housing 6 comprises, for example, a bottom 24 having an axisymmetrical form, interrupted by the hollow rib 18 of the housing 6. The shape of the bottom 24 of the housing 6 corresponds, for example, to a spherical cap and/or ellipsoid of revolution.

The optical device and in particular the reflector 10 could comprise, opposite the housing 6, a slot that nests at least partially with the hollow rib 18 of the housing 6. Such nesting facilitates the desired positioning effect, in particular by centering. The slot forms in this case a hollow rib 32 on an opposite face of the reflector 10 from the housing 6.

The hollow rib 32 of the reflector 10 may cover the hollow rib 18 of the housing 6 and comprise one or more openings 34 for allowing the light emitted by the diode or diodes 14 to pass through. The openings 34 for the passage of the beam emitted by the light source 4 are located in this case opposite the diodes 14.

The reflector 10 may have one or more foci and the hollow ribs 18, 32 are designed such that the light source 4, namely the diodes 14 in this case, are located substantially at the foci(for example, F1 and F2 in FIG. 2). The reflector 10 may in particular be designed such that the light rays emitted by the diodes 14 are reflected parallel to one another, in the direction of the optical axis 12.

In the embodiments in FIGS. 1 to 4, the hollow rib 18 of the housing 6 is located on either side of a plane of symmetry passing through the optical axis 12 of the device, orthogonal to the section plane in FIG. 2.

The flanks 20 of the hollow rib 18 of the housing 6 thus have outer edges 23 in the form of an arc of a circle and/or ellipse. The flanks 20 are connected here to the bottom 22 of the hollow rib 18 of the housing in a rectilinear manner. The latter is domed slightly toward the inside of the enclosure 8.

In a corresponding manner, the reflector 10 may be symmetrical with respect to the abovementioned plane of symmetry. The hollow rib 32 thereof comprises, for example, two flanks 36, in which the openings 34 are respectively formed. The flanks 36 of the hollow rib 32 of the reflector 10 are connected, in particular, by a bottom 38, which is slightly convex in this case. The reflector 10 comprises in this case two bottom parts 28, 30 in the form of portions of a paraboloid of revolution that are connected by the hollow rib 32 of the reflector 10.

In these embodiments, the hollow ribs 18, 32 are, for example, rectilinear. In use, the hollow ribs 18, 32 are intended to be oriented vertically. As a variant, they may also be intended to be used horizontally.

Figure 5:
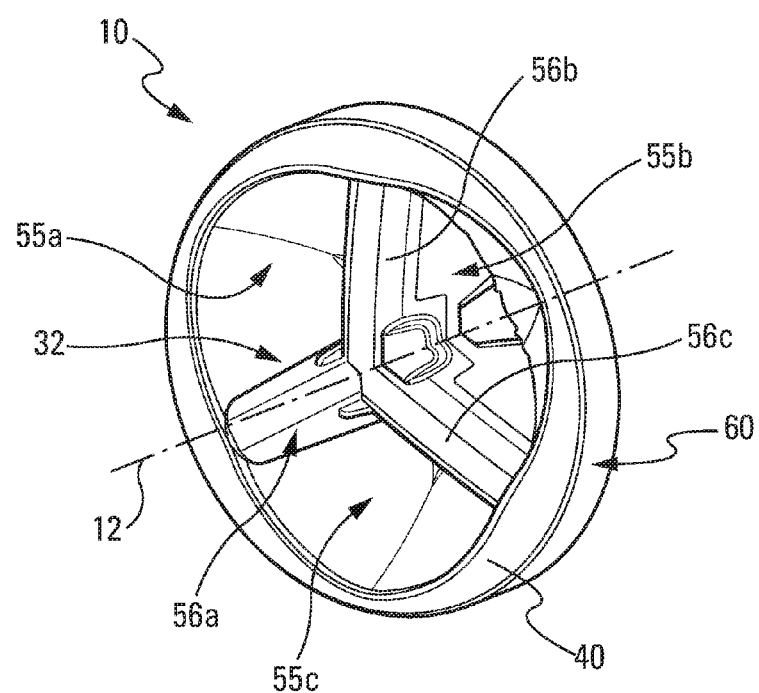
FIG. 5 illustrates a perspective view of another variant embodiment of the optical device according to the invention.

As illustrated in FIG. 5, as a variant, they may also comprise a plurality of arms 56a, 56b, 56c. It is in this case in the form of a star, in particular having three arms. The bottom of the reflector 10 is thus divided into three zones 55a, 55b, 55c that are designed to each reflect the rays emitted by the corresponding diodes in the direction of the optical axis 12.

Such an embodiment makes it possible to produce by itself locking in all spatial directions.

In the embodiments in FIGS. 1 to 4, the cooperation of the hollow ribs 18, 32 makes it possible to obtain locking in at least two spatial directions.

In the embodiment in FIGS. 1 to 3, locking in the third direction, namely the vertical direction in the figures, may be obtained by a clamping effect.

Figure 4:
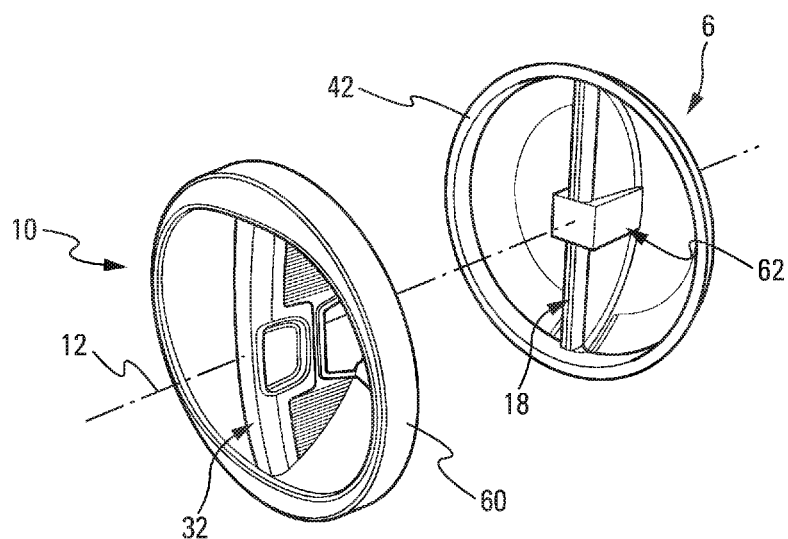
FIG. 4 illustrates an exploded perspective view of a first variant embodiment of the housing and of the optical device of the device according to the invention.

In the embodiment in FIG. 4, as illustrated by the various arrows, it may be obtained by respective abutment surfaces 62 located notably on said hollow rib 18 of the housing 6.

This being the case, with reference to FIG. 2, the reflector 10 has in this case a peripheral edge 40 projecting with respect to a peripheral edge 42 of the housing 6. The bottom 38 of the hollow rib 32 of the reflector 10 projects with respect to the peripheral edge 40 of the reflector 10. The bottom 22 of the hollow rib 18 of the housing 6 is set back with respect to the peripheral edge 42 of the housing 6. The light-emitting device 1 according to the invention comprises a cavity 44 between the bottom 22 of the hollow rib 18 of the housing 6 and the hollow rib 32 of the reflector 10.

As can be seen more particularly in FIGS. 4 and 5, the reflector 10 may comprise, for example, a peripheral skirt 60 along its peripheral edge 40, placed opposite the peripheral edge 42 of the housing 6.

It may be noted that the reflector 10 advantageously comprises a number of reflection cavities, namely in this case two in the embodiment in FIGS. 1 to 4 and three in the embodiment in FIG. 5, the reflection cavities being separated by the hollow rib 32 of the reflector 10. Each cavity cooperates respectively with one of the light-emitting diodes 14.

The hollow rib 32 of the reflector 10, the cavities and the light-emitting diodes 14 may be arranged such that the light rays emitted by a given one of the light-emitting diodes 14 only reaches the cavity of the reflector 10 which is respectively associated therewith.

The reflector 10 and the hollow rib or ribs 32 of the reflector 10 separating these cavities are, for example, made in one piece from the same material.

According to another aspect of the invention, the light source 4 is in thermal contact with the housing 6, the latter being designed to allow thermal dissipation of the heat released by the light source 4.

To this end, the housing 6 may be produced, for example, from a metal material such as aluminum or an aluminum alloy, or any other metal or metal alloy that has good thermal conductivity. As explained in the following text, it may also have one or more forms that favor the presence of surfaces for heat exchange with the ambient air.

This provides a solution in which the function of cooling the light source 4 is carried out by the housing 6 itself, thereby making it possible to reduce the number of components and to give the headlamp equipped in this way an advantageous appearance.

In this regard, it will be understood that the hollow rib 18 of the housing 6 and, in particular, the flanks 20 thereof allow a first increase in the heat exchange surface area provided by the housing 6.

As can be seen more readily in FIG. 3, the hollow rib 18 of the housing 6 may be furnished with heat dissipation fins 26 located in this case outside the enclosure 8 defined by the housing 6.

Advantageously, the extension given to the fins 26 limits them in the volume provided by the bottom 24 of the housing 6: the fins 26 do not pass beyond the outer surface of the housing 6. This level of integration helps to give the device according to the invention a favorable appearance.

The fins 26 are in this case transverse to the direction of extension of the hollow rib 18 of the housing 6 or of the arms thereof. They extend, for example, from the bottom 22 of the hollow rib 18 of the housing 6 to the edges 23 thereof and/or from one flank 20 of the hollow rib 18 of the housing 6 to the other.

As a variant, they may be parallel to the axis of extension or have any other orientation that is favorable to circulation of air by natural convection.

The fins 26 are at least provided in the vicinity of a part of said hollow rib 18 of the housing 6 carrying the light source 4, in particular in the region of the supports 16. The fins 26 are in this case distributed regularly along the hollow rib 18 of the housing 6. However, any other distribution is possible.

In order to further improve the appearance of the housing 6, the latter will advantageously have a smooth outer surface, that is to say one without forms or other fins that are intended to increase the heat exchange surface area, outside the hollow rib or ribs of the housing 6.

The invention also relates to the headlamp 2 comprising the emitting device 1.

With reference to FIG. 1, the headlamp 2 may also comprise a closing outer lens 50 and optionally a style part, or mask, located between the closing outer lens 50 and the reflector 10, along the optical axis 12 of the emitting device.

The outer lens 50 and/or the housing 6 may each comprise a lip 52, 54 for bearing against one another. They are secured together, for example, by a double-sided adhesive (not shown), placed in this case between the lips 52, 54.

The headlamp 2 also comprises, for example, a trim ring 58, in two annular parts 62, 62' that are axially joined together. This ring 58 makes it possible in particular to conceal the connection between the outer lens 50 and the housing 6.

The housing 6 may comprise flanges 64 for fixing to a support, in particular a support mounted on a motor vehicle (not shown). The flanges 64 are located in this case on either side of the hollow rib 18 of the housing 6, at one of the longitudinal ends thereof. They are designed to allow, in use, an adjustment of the inclination of the beam emitted by the headlamp 2 with respect to the horizontal.

The headlamp 2 may in particular be used as a foglamp, although this application should not be considered limiting in anyway.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A light-emitting device for a motor vehicle headlamp, said device comprising a housing, at least one light source disposed on said housing and an optical device directing one or more light beams emitted by said at least one light source, said housing comprising a projecting element for allowing a fixed position of said optical device with respect to said housing, wherein said projecting element comprises at least one first hollow rib formed in said housing and said optical device comprises at least one second hollow rib having a slot that nests at least partially with said at least one first hollow rib of said housing in order to fix said optical device in a position on said housing;

wherein said housing comprises a peripheral edge, said at least one first hollow rib of said housing extends between at least two positions along said peripheral edge, said at least one first hollow rib supporting said at least one light source on said housing and said at least one second hollow rib of said optical device nests at least partially with said at least one first hollow rib to position said at least one light source in a desired position relative to said optical device;

wherein said optical device is at least one reflector having said at least one second hollow rib integrally formed therewith, said at least one second hollow rib nesting on at least a portion of said at least one first hollow rib and causes said positioning of said at least one light source relative to said at least one reflector.

2. The light-emitting device according to claim 1, wherein said at least one light source comprises one or more light-emitting diodes, said one or more light-emitting diode or diodes being disposed in a region of said at least one first hollow rib of said housing.

3. The light-emitting device according to claim 2, wherein said reflector has at least one focus and said at least one light source becomes situated generally at said focus when said at least one second hollow rib nests with said at least one first hollow rib when said reflector is mounted on said housing.

4. The light-emitting device according to claim 3, wherein said reflector is positioned on said at least one first hollow rib of said housing such that said light-emitting diode or diodes is/are located at said focus or foci.

5. The light-emitting device according to claim 4, wherein said reflector comprises a plurality of reflection cavities, each of said plurality of reflection cavities cooperating with a separate light source, said at least one second hollow rib of said reflector separating said plurality of reflection cavities.

6. The light-emitting device according to claim 3, wherein said reflector comprises a plurality of reflection cavities, each of said plurality of reflection cavities cooperating with a separate light source, said at least one second hollow rib of said reflector separating said plurality of reflection cavities.

7. The light-emitting device according to claim 6, wherein said reflector and said at least one second hollow rib of said reflector separating said plurality of reflection cavities are made in one piece from the same material.

8. The light-emitting device according to claim 2, wherein said at least one second hollow rib of said optical device comprises one or more openings for allowing the light emitted by said diode or diodes to pass through.

9. The light-emitting device according to claim 8, wherein said optical device is a reflector having at least one focus.

10. The light-emitting device according to claim 1, wherein said at least one first hollow rib of said housing is rectilinear and/or comprises a number of arms.

11. The light-emitting device according to claim 10, wherein said slot forms a hollow rib on an opposite face of said optical device from said housing.

12. The light-emitting device according to claim 10, wherein said at least one light source emits one or more light beams centered on an axis which is transverse to an optical axis of said device.

13. The light-emitting device according to claim 10, wherein said at least one light source comprises one or more light-emitting diodes, said one or more light-emitting diode or diodes being disposed in the region of said at least one first hollow rib of said housing.

14. The light-emitting device according to claim 1, wherein said slot forms said at least one second hollow rib on an opposite face of said at least one reflector from said housing.

15. The light-emitting device according to claim 14, wherein said at least one light source comprises one or more light-emitting diodes, said one or more light-emitting diode or diodes being disposed in the region of said at least one first hollow rib of said housing.

16. The light-emitting device according to claim 1, wherein said at least one light source emits one or more light beams centered on an axis which is transverse to an optical axis of said device.

17. The light-emitting device according to claim 16, wherein said at least one light source comprises one or more light-emitting diodes, said one or more light-emitting diode or diodes being disposed in the region of said at least one first hollow rib of said housing.

18. The light-emitting device according to claim 1, wherein said housing defines an enclosure for said at least one light source, said at least one light source being in thermal contact with said housing, said housing being designed to allow thermal dissipation of heat released by said at least one light source.

19. The light-emitting device according to claim 1, wherein said housing comprises flanges for fixing to a support.

20. A motor vehicle headlamp comprising said light-emitting device according to claim 1.

21. The light-emitting device according to claim 1, wherein said peripheral edge is generally circular.

22. A light-emitting device for use on a vehicle comprising:
a housing having a peripheral edge; and
a first elongated rib integrally formed with the peripheral edge;
a first concave reflector having an integrally formed second elongated rib and a second concave reflector attached to an opposite side of said second elongated rib, each of said first concave reflector and said second concave reflector having a focus;
at least one first light source and at least one second light sources supported by said first elongated rib such that said at least one first light source and said at least one second light source become positioned at said focus of said first concave reflector and said second concave reflector, respectively;
wherein said first elongated rib engages said second elongated rib to thereby affix the reflector in a fixed position relative to said housing.

23. The light-emitting device according to claim 22, wherein said first elongated rib is located back of said peripheral edge.

24. The light-emitting device according to claim 23, wherein at least a portion of said second elongated rib extends forward of said peripheral edge.

25. The headlight according to claim 22, in which said first or second light source is mounted on a forward region of said first or second elongated rib at said focus of at least one reflective surface when said first and second concave reflector is mounted on said housing.

26. The headlight according to claim 25, in which said first elongated rib and said housing comprise a heat sink for said first and second light sources.

27. The headlight according to claim 22, in which said first elongated rib extends along a diameter of said peripheral edge.

28. The headlight according to claim 22, in which said second elongated rib extends along a diameter of a second peripheral edge of said first and second concave reflector.

29. A light-emitting device for use on a vehicle comprising;
a reflector having:
a circular peripheral edge;
a forward elongated rib which extends from said circular peripheral edge generally along a diameter of said circular peripheral edge;
at least one reflective surface which has a focus and defines an opening; a housing having:
a reflector housing elongated rib which:
extends from a peripheral edge along a diameter of said peripheral edge;
engages and nests with said forward elongated rib to support said at least one reflective surface;
contains a support which extends through said opening and supports a light source substantially of said at least one reflective surface at said focus.

30. The light-emitting device according to claim 29, wherein the entire of said reflector is supported by said reflector housing elongated rib.

31. The light-emitting device according to claim 29, wherein said forward elongated rib extends along a full diameter of said circular peripheral edge.

* * * * *